though some water loss is desirable because of the filter cake which forms on the wall of the well bore, the filter cake should be thin, tough and slick, with low permeability. A thick, soft, sticky filter cake causes problems ranging from stuck drill pipe to difficulty in making logs and running casing.

United States Patent [19]
Fox

[11] 4,008,775
[45] Feb. 22, 1977

[54] METHOD OF USING A POROUS Fe₃O₄ DRILLING MUD ADDITIVE

[75] Inventor: Irwin Fox, Ballwin, Mo.

[73] Assignee: Ironite Products Company, Madison, Ill.

[22] Filed: Mar. 12, 1976

[21] Appl. No.: 666,193

Related U.S. Application Data

[63] Continuation-in-part of Ser. No. 374,555, June 28, 1973, abandoned.

[52] U.S. Cl. .............................. 175/64; 166/244 C; 252/8.5 R; 252/8.5 B
[51] Int. Cl.² ........................................... C09K 7/04
[58] Field of Search ......................... 175/64, 65, 66; 166/244 C, 279, 310; 252/8.5 R, 8.5 A, 8.5 B, 8.55 E, 387; 423/244

[56] References Cited
UNITED STATES PATENTS

| | | | |
|---|---|---|---|
| 1,771,136 | 7/1930 | Murphy | 423/244 |
| 2,003,701 | 6/1935 | Stinson | 252/8.5 B |
| 2,276,075 | 3/1942 | Wuensch | 175/66 |
| 2,298,984 | 10/1942 | Stinson | 252/8.5 B |
| 2,941,783 | 6/1960 | Stinson | 175/66 X |
| 3,301,323 | 1/1967 | Parsons | 175/64 |
| 3,307,625 | 3/1967 | Johnson et al. | 175/66 X |
| 3,576,221 | 4/1971 | Hasiba | 175/66 |
| 3,618,667 | 11/1971 | Snavely | 166/310 |
| 3,713,499 | 1/1973 | Arscott et al. | 175/66 |

*Primary Examiner*—Stephen J. Novosad
*Assistant Examiner*—George A. Suchfield

[57] ABSTRACT

An iron oxide having the ideal composition Fe₃O₄ has a unique high porosity, substantially spherical particle structure. Used in oil and gas well drilling muds, it scavenges hydrogen sulfide. It also improves the rheological properties of the mud, maintains its stability under high temperatures, and functions as a mud weighting material. Upon completion of drilling, the drilling mud containing the porous Fe₃O₄ additive may be left in place between the inner casing and the formation wall or the outer casing as a packer fluid.

3 Claims, 2 Drawing Figures

METHOD OF USING A POROUS Fe₃O₄ DRILLING MUD ADDITIVE

REFERENCE TO RELATED APPLICATION

This is a continuation-in-part of Application Serial No. 374,555 filed June 28, 1973, now abandoned.

BACKGROUND OF THE INVENTION

Hydrogen sulfide is frequently encountered in drilling oil and gas wells. It is corrosive to the drill pipe and casing. When a drill pipe breaks due to hydrogen sulfide embrittlement, the drilling operation must be interrupted and the drill pipe string repaired. It is also a pollutant to the environment and a risk to the health and lives of the drilling personnel. Low concentrations of hydrogen sulfide produce irritation of conjunctiva and mucous membranes, headackes, dizziness, nausea, and lassitude. Exposure to high concentrations can result in death.

Magnetite has been used as a weighting material in drilling muds, as shown in U.S. Pat. No. 2,276,075; but without effectively scavenging hydrogen sulfide or substantial improvement in mud rheology.

OBJECTS OF THE INVENTION

It is an important object of the present invention to provide a type of $Fe_3O_4$ having a large surface area which is useful in drilling muds as an effective scavenger for hydrogen sulfide, thereby reducing corrosion or embrittlement of the drill pipe and casings and avoiding the health hazard mentioned.

Other objects are to provide a porous $Fe_3O_4$ which in drilling muds improves the rheological properties and thermal stability thereof, while also serving as a weighting agent; and to provide a porous $Fe_3O_4$ whose concentration in drilling muds is easily monitored by magnetic techniques.

SUMMARY OF THE INVENTION

The present invention provides a new additive iron oxide having the ideal phase composition of substantially $Fe_3O_4$ whose particles have a sponge-like porosity with a surface area many times as great as that of magnetite. Used in oil well drilling mud, it is exceptionally effective in scavenging hydrogen sulfide. It also improves the rheological properties and thermal stability of the mud, and has further utility as set forth hereinafter.

DETAILED DESCRIPTION OF THE INVENTION

Figure 1:
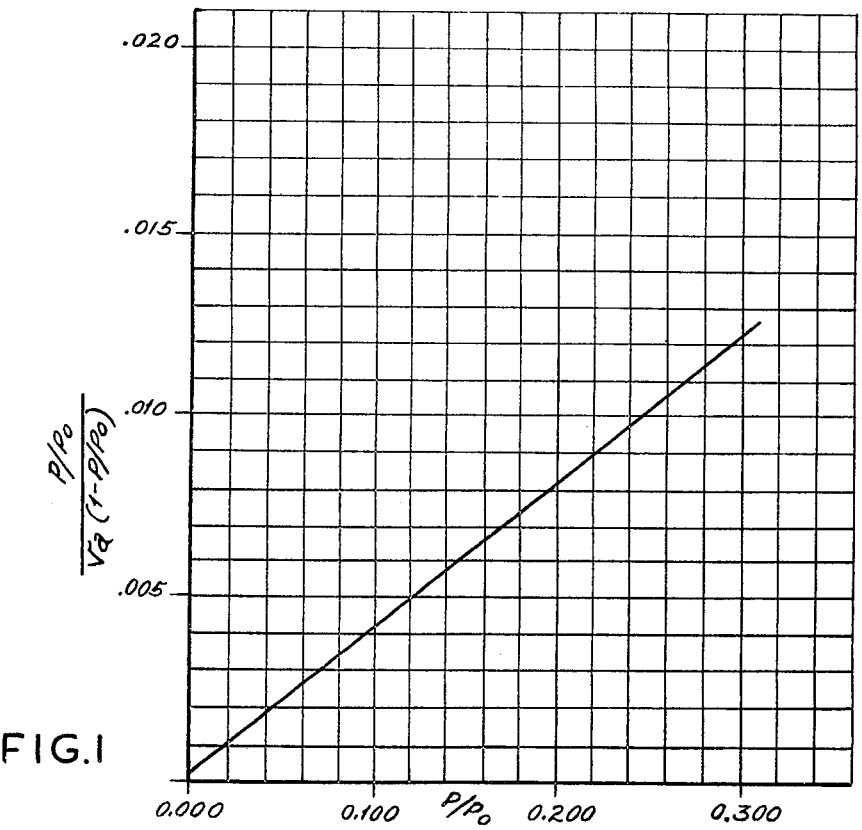

The porous iron oxide of this invention is prepared by oxidizing iron containing carbon under controlled oxidative conditions. For example, iron borings containing about 3.5 percent carbon and somewhat less silicon and other minerals may be ground to a powder to pass through a 10-mesh screen. So powdered, it is subjected to oxidation at relatively low temperatures of about 400° F. to 450° F., under conditions so conventionally controlled as to form an oxide having an ideal composition $Fe_3O_4$ without proceeding to $Fe_2O_3$. The initial presence of such carbon, silicon and accompanying elements in the iron provides such a structure that the resultant $Fe_3O_4$ particles will have the exceptional spongy porosity hereafter described.

To be useful for the purposes of this invention, the oxide must be further processed, assuming that the oxidation process has left it agglomerated, the oxidized mass is first de-agglomerated by crushing, without grinding into fine particles. Sufficient water and base, usually sodium hydroxide, is added so that the mixture consists of about 50 to about 90 percent by weight water, but preferably 70 percent, and has a pH essentially 7.0. If the initial pH of the mixture is less than 5.5, it is preferred that ammonia be used as the base. The neutralized water-oxide mixture is mechanically agitated to produce a slurry, and is passed through a 140 mesh screen, removing larger unreacted iron particles.

Excess water is then removed from the slurry. The recovered material, which contains about 50 percent by weight water, is dried at about 400° F. until the iron oxide contains about 10 to 20 percent by weight of water. Higher drying temperatures should be avoided since the $Fe_3O_4$ may further oxidize. It is preferred that the dried material contain no less than about 10 percent by weight of water inasmuch as the product is otherwise dusty and difficult to redisperse in water. If the drying process utilized should result in caking, any gentle de-agglomeration step will restore the material to its screened particle size.

Examination of the dried $Fe_3O_4$ with a scanning electron microscope shows the product to comprise porous, sprenge-like, somewhat spherical particles. Examination with a Coulter counter showed that 98 percent of the particles of a typical batch have an average diameter within the range of about 1.5 to about 60 microns. This is considered a desirable size range for subsequent use in drilling muds; and to have 95 percent of the particles within this size range (or other desired size range) is commercially satisfactory.

While 60 microns corresponds theoretically to a 240 mesh screen, a screen not larger than 100 mesh and preferably about 140 mesh will satisfactorily remove most larger particles including those of unreacted iron.

Analysis of the particles by emission spectroscopy showed that they were iron oxide having an ideal composition of substantially Fe₃O4. The porous iron oxide was further characterized by a hardness of about 6 and a density of about 4.55 gm/cm³. The material was ferrimagnetic at room temperature, having a curie point at 575° C., a saturation magnetism of 480 cgs/cm³, and a remanent magnetism approximately 5 percent of saturation.

The iron powder from which the $Fe_3O_4$ is derived usually contains trace amounts of minerals other than iron. On analysis by emission spectroscopy these materials in a typical batch are as follows, percentages being expressed as percent by weight of the sample: 0.04 percent aluminum, 0.003 percent barium, 0.08 percent calcium, 0.2 percent chromium, 0.1 percent copper, 0.1 percent magnesium, 0.7 percent manganese, 0.1 percent molybdenum, 0.1 percent nickel, 2.0 percent silicon dioxide, 0.2 percent sodium, 0.07 percent titanium, and 0.02 percent vanadium.

The dried, porous $Fe_3O_4$ is ideally suited for use in drilling muds, ordinarily in combination with clay and other conventional additives such as weighting agents, caustic for pH adjustment, calcium compounds for conditioning in calcium formations and for pH control, hydrocarbons for fluid loss control and lubrication, sealants, thinners such as lignosulfonates and tannins for dispersion of mud solids, and bactericides.

In the drilling mud the porous iron oxide is an effective scavenger for hydrogen sulfide. The reaction product is mainly $FeS_2$ with smaller amounts, if any, of $Fe_3S_4$. This reaction is pH dependent to the extent that $H_2S$ preferentially reacts with caustic, e.g. NaOH or other alkaline materials, in the known manner. Since the reaction of $H_2S$ with the porous iron oxide of the present invention is nonionic, the initial reaction of the $H_2S$ is with the caustic until it is substantially exhausted and the pH lowered below about 10.5. The $FeS_2$ and the lesser amount of $Fe_3S_4$, if any, unlike other forms of iron sulfides, are extremely stable and will not give up sulphur regardless of the subsequent pH of the mud, nor will they regenerate hydrogen sulfide.

The $FeS_2$ is similar to a natural pyrite. Its particles appear to agglomerate, so as to be removed along the drill cuttings when the mud is screened before re-circulation. The exceptional reaction characteristics, in conjunction with the favorable rheological properties hereafter described, result in the capability of treating far greater concentrations of $H_2S$ than is now possible using other agents.

For the purpose of scavenging hydrogen sulfide, about 2 to 20 pounds of porous $Fe_3O_4$ are added per barrel of mud, depending on the hydrogen sulfide present, and sufficient other additives are included to provide a mud in the above weight range. The above range is not critical and more or less oxide may be used as desired.

In addition to functioning as a hydrogen sulfide scavenger, the porous $Fe_3O_4$ may also be used for other purposes, principally improving the rheological properties and thermal stability of the mud and serving as a weighting agent therein. In order to appreciate these additional functions it is important to understand the function of a drilling mud in serving as a lubricant. The mud is circulated down the interior of the drill pipe, through the drill bit and up the annular space between the drill pipe and the formation wall or casing to the surface. It thus removes the heat produced by the cutting action of the bit as well as the cuttings themselves, carrying them from the drill bit and up the annulus to the surface, where they are separated. In the annulus, the mud reduces the drag of the rotating drill pipe and provides sufficient hydrostatic pressure to contain any liquid or gaseous component within the formation being penetrated. The substantially spherical shape of the present iron oxide particles eases the flow of the mud. Finally, the mud should be thermally stable and therefore capable of withstanding bottom-hole pressures and temperatures. The present oxide particles do not deteriorate under the extreme pressures and temperatures so encountered.

Materials are frequently added to the mud to decrease its viscosity, thus improving its lubricating qualities. Lignosulfonates and tannins, the conventional additives for this purpose, tend to break down in use at commonly encountered bottom-hole temperatures; the mud viscosity then increases, and more additive must be added to overcome the increased viscosity. Using the present porous $Fe_3O_4$ any stiffening of the mud in use may be usually overcome merely by the addition of water.

The porous $Fe_3O_4$ of this invention is useful as a weighting agent; and, unlike other iron oxides, its substantially spherical shape is rheologically advantageous. No other prior art iron oxides (or other conventional weighting agents such as barite) are useful for improving the lubricating qualities of the mud. Instead, barite tends to grind down into fines during use, thus changing the flow characteristics of the mud, and magnetite is abrasive to the bit, drill pipe and casing. When the porous iron oxide of this invention is added as a weighting agent, as much as 500 pounds of oxide per barrel of mud may be used, to provide about an 18 pound mud.

When the drilling mud contains between about 2 and about 20 pounds of porous $Fe_3O_4$ per barrel of mud, the drilling mud may be left in place as a packer fluid with little or no additional chemical treatment when the drilling is completed. This effects considerable savings in materials and labor. In a packer fluid the suspended particles should not pack down, and the porous iron oxide described herein is a very effective suspending agent. Further, since hydrogen sulfide present has been reacted to form a stable pyrite-like substance, it offers no danger of gradually corroding the well casing.

EXAMPLE 1

In this example the surface area of the porous $Fe_3O_4$ of this invention was determined by the Brunauer-Emmett-Teller equation for determining surface areas by the surface adsorption of nitrogen. This classical method is described in the Journal of the American Chemical Society, 60, 309-319 (1938). These results are compared with those for a similar determination of surface area for magnetite having a particle size similar to that of the porous oxide. Briefly described, a sample comprising 11.2094 g. of porous $Fe_3O_4$ was placed in an adsorption bulb for the determination of surface area with a 4-4680 Aminco Adsorptomat. The sample was preconditioned for 4 hrs. at 93° C. and $5 \times 10^{-6}$ torr. The "dead space factor" ($D_f$) was determined by the introduction of helium into the sample section and found to be 0.5931 cc. STP/cm. Hg. After the helium was evacuated, nitrogen was introduced in dose sized ($D_a$) of 2.034 cc. STP and an equilibrium time of 5 min. was allowed after each dose. The saturated vapor pressure ($P_o$) was found to be 76.1 cm. Hg; hence, the factor ($P_o D_f$) was calculated as 45.135. From the following data in Table I, $$\frac{P/P_o}{V_a(1 - P/P_o)}$$

versus $P/P_o$ was plotted as shown in FIG. 1 in the drawing. The surface area of the $Fe_3O_4$, as reported in the table, was then determined from the drawing.

TABLE I

| No. of Doses | 1 | 2 | 3 | 4 (2−3) | 5 | 6 (4×5) | 7 (1÷6) | $V_M$ | SURFACE AREA, $M^2/G$ |
|---|---|---|---|---|---|---|---|---|---|
| $N_d$ | $P/P_o$ | $N_d D_a$ | $\frac{(P)P_o}{(P_o)}$ | $D_f V_a$ | $\frac{(1-P)}{P_o}$ | $\frac{V_a(-P)}{P_o}$ | $\frac{P/P_o}{V_a(1-P/P_o)}$ | $V_M = \frac{1}{S+I}$ | $A = \frac{4.38 V_M}{W}$ |
| 12 | 0.046 | 24.408 | 2.076 | 22.332 | 0.954 | 21.305 | 0.0022 | | |
| 13 | 0.061 | 26.442 | 2.753 | 23.689 | 0.939 | 22.244 | 0.0027 | | |
| 14 | 0.079 | 28.476 | 3.566 | 24.910 | 0.921 | 22.942 | 0.0034 | | |
| 15 | 0.100 | 30.510 | 4.514 | 25.996 | 0.900 | 23.396 | 0.0043 | | |
| 17 | 0.142 | 34.578 | 6.409 | 28.169 | 0.858 | 24.169 | 0.0059 | 25.0 | 9.8 |

TABLE I-continued

| No. of Doses | 1 $N_d$ | 2 $P/P_o$ | 3 $N_dD_n$ | 4 (2–3) $\frac{(P)P_o}{(P_o)}$ | 5 $D_fV_a$ | 6 (4×5) $\frac{(1-P)}{P_o}$ | 7 (1÷6) $\frac{V_a(-P)}{P_o}$ | $\frac{P/P_o}{V_a(1-P/P_o)}$ | $V_M = \frac{1}{S+I}$ | SURFACE AREA, M²/G $A = \frac{4.38 V_M}{W}$ |
|---|---|---|---|---|---|---|---|---|---|---|
| 19 | 0.187 | 38.646 | 8.440 | 30.206 | 0.813 | 24.557 | 0.0076 | | | |
| 21 | 0.232 | 42.714 | 10.471 | 32.243 | 0.768 | 24.763 | 0.0094 | | | |
| 23 | 0.279 | 46.782 | 12.593 | 34.189 | 0.721 | 24.650 | 0.0113 | | | |
| 24 | 0.302 | 48.816 | 13.631 | 35.185 | 0.698 | 24.559 | 0.0123 | | | |

Figure 2:
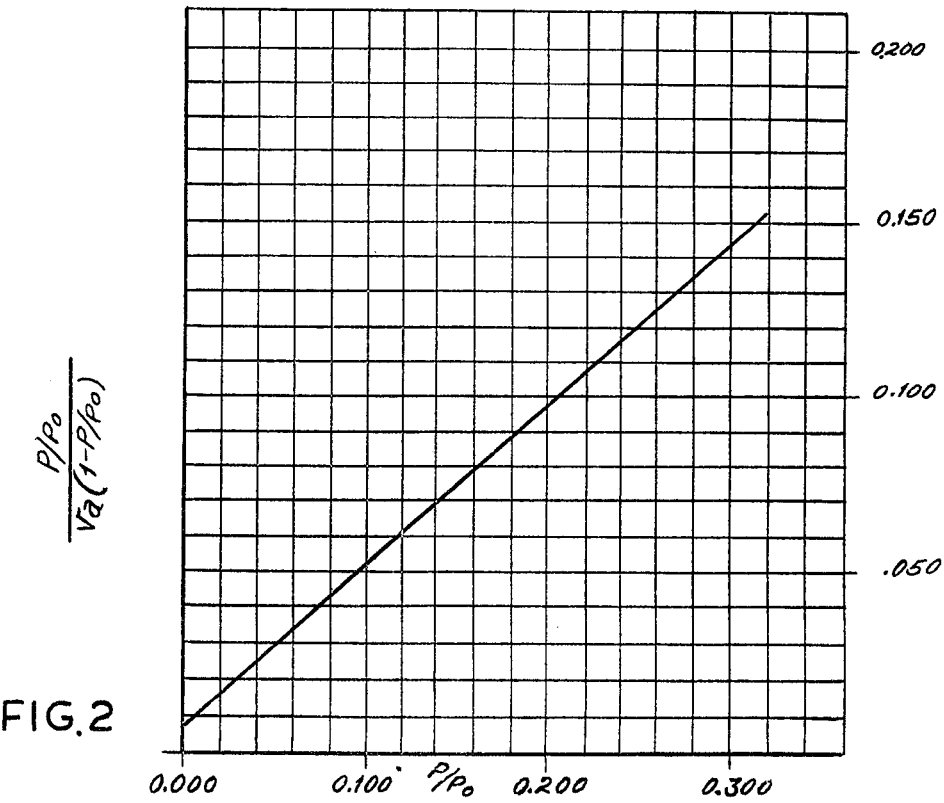

*Plot $\frac{P/P_o}{V_a(1-P/P_o)}$ versus $P/P_o$; $V_M = \frac{1}{\text{slope} + \text{intercept}}$ Following the procedure used for the determination of the surface area of the porous $Fe_3O_4$ of this invention, 16.0525 g. of magnetite, a mineral form of $Fe_3O_4$, was preconditioned for 4 hrs. at 93° C. and $5 \times 10^{-6}$ torr. The $D_f$ was found to be 0.5462 cc. STP/sm. Hg, the $D_a$ was 2.034 cc. STP, the $P_o$ was 76.0 cm. Hg, and the $P_oD_f$ was calculated as 41.511. From the data in Table II, the BDT equation was plotted as shown in FIG. 2 in the drawing, and the surface area, which is also reported in the table, was determined:

TABLE II

| No. of Doses | 1 $N_d$ | 2 $P/P_o$ | 3 $N_dD_n$ | 4 (2–3) $\frac{(P)P_o}{(P_o)}$ | 5 $D_fV_a$ | 6 (4×5) $\frac{(1-P)}{P_o}$ | 7 (1÷6) $\frac{V_a(-P)}{P_o}$ | $\frac{P/P_o}{V_a(1-P/P_o)}$ | $V_M^* = \frac{1}{S+I}$ | SURFACE AREA, M²/G $A = \frac{4.38 V_M}{W}$ |
|---|---|---|---|---|---|---|---|---|---|---|
| 2 | 0.055 | 4.068 | 2.283 | 1.785 | 0.945 | 1.687 | 0.033 | | | |
| 3 | 0.098 | 6.102 | 4.068 | 2.034 | 0.902 | 1.835 | 0.053 | | | |
| 4 | 0.142 | 8.136 | 5.895 | 2.241 | 0.858 | 1.923 | 0.074 | | | |
| 5 | 0.184 | 10.170 | 7.638 | 2.532 | 0.816 | 2.066 | 0.089 | | | |
| 6 | 0.229 | 12.204 | 9.506 | 2.698 | 0.771 | 2.080 | 0.110 | | 2.2 | 0.6 |
| 7 | 0.273 | 14.238 | 11.333 | 2.906 | 0.727 | 2.112 | 0.129 | | | |
| 8 | 0.319 | 16.272 | 13.242 | 3.030 | 0.681 | 2.063 | 0.155 | | | |

*Plot $\frac{P/P_o}{V_a(1-P/P_o)}$ versus $P/P_o$; $V_M = \frac{1}{\text{slope} + \text{intercept}}$ By comparing the results of Table I with those of Table II, it is seen that the porous $Fe_3O_4$ particles of this invention have a surface area at least sixteen times as great as magnetite. With other batches of material, the porous $Fe_3O_4$ particles may have a surface area from about 10 to 25 times as great as magnetite, as determined by the BET method, but preferably are within the range of from about 15 to about 20 times as great.

reported in the table which follows. The mud viscosity was determined with a rotational viscometer at rotor speeds of 600 and 300 rpm. Using the dial readings $d_{600}$ and $d_{300}$, a number of parameters were determined as follows:

apparent viscosity (AV) = 1/2 $d_{600}$
plastic viscosity (PV) = $d_{600}$ - $d_{300}$
Yield point (YP) = $d_{300}$ – plastic viscosity The plastic viscosity reflects the inherent interparticle friction and its magnitude is a function of particle size and concentration. The yield point reflects the attraction of the solid particles to one another.

As shown in Table III below, adding the $Fe_3O_4$ of this invention greatly changes the rheological properties of the mud. Where added in quantities up to 50 pounds per barrel, both the apparent viscosity and the plastic viscosity are much improved. The outstanding improvement in yield point persists even where much greater quantities are added.

TABLE III

| Test No. | 1 | 2 | 3 | 4 | 5 |
|---|---|---|---|---|---|
| Porous iron oxide (ppb) | 0 | 25 | 50 | 75 | 100 |
| $d_{600}$ | 13.5 | 7 | 6 | 11 | 15 |
| $d_{300}$ | 10 | 4 | 4 | 6 | 8 |
| AV | 6.7 | 3.5 | 3 | 5.5 | 7.5 |
| PV | 3.5 | 3 | 2 | 5 | 7 |
| YP | 6.5 | 1 | 2 | 1 | 1 |

EXAMPLE 2

In this example, varying amounts of porous iron oxide were added to a number of drilling muds and the effect on viscosity was measured. The muds tested in this example were non-Newtonian; that is to say, viscosity varied with shear rate. The water-based mud before the addition of the porous iron oxide of this invention consisted of 10 pounds per barrel (ppb) of bentonite and 0.5 pound per barrel of caustic. The mud was stirred for 30 minutes and amounts of porous iron oxide, up to 100 pounds per barrel, were added as

EXAMPLE 3

The principal purpose of this example is to demonstrate that the porous $Fe_3O_4$ is less abrasive than barite. To do this, in Test 12 the wear of a 14.0 pound per gallon slurry of barite on the metal blades of a Waring blender after stirring for 10 minutes, measured in grams lost by abrasion, was compared with that of Test 13 wherein the slurry comprised a 14.0 pound per gallon slurry of porous $Fe_3O_4$. The results are reported in Table LV below:

| Test No. | 12 | 13 |
|---|---|---|
| Blade Wear | 0.0488 g. | 0.0198 g. |

The reduced abrasiveness of the porous $Fe_3O_4$ as compared to barite is unexpected inasmuch as the porous $Fe_3O_4$ has a hardness of 6.0 on the Mohs' scale while barite has a hardness of 3.3. While applicant does not wish to be bound by any theory, it is believed that this difference is the result of: (a) the spherical nature of the $Fe_3O_4$ particles, which contrasts with the sharp particle edges present in barite; and (b) the high porosity which allows particle deformation. Furthermore, even though the present porous particles deform, they do not appear to grind down into fines like barite.

EXAMPLE 4

In this example it is demonstrated that the porous $Fe_3O_4$ described herein reduces the shear strength and gel strength of drilling muds. Shear strength and gel strength are measures of the thixotropic character of the mud. They indicate the ease or difficulty with which a column of mud at rest can be brought into motion.

Reduction in shear and gel strength after aging is important, for example, when the circulation of the mud in the well is interrupted as when a drilling rig is down during repair. If the mud "sets up" it is difficult to resume its circulation. Avoidance of mud "set up" is important also when the drilling mud is used as a packer fluid; otherwise removing the inner tubing for repair is very difficult.

Gel strength (gels) in pounds per 100 sq. ft. was measured by reading the dial of a rotational viscometer at 3 rpm. This was done at 0 and 10 minutes following vigorous stirring at 600 rpm. and is reported in pounds per 100 square feet. Shear strength was also determined in a conventional manner and is also reported in pounds per 100 square feet.

In treating the mud with the present porous iron oxide, it was added at the rate of 9 pounds per barrel. Aging was at 350° F. for 65 hrs.

According to the following table, the addition of the porous iron oxide greatly lessened the shear strength after aging (from 600 psi to 250 psi). Similarly gel strength developed after 10 minutes was markedly reduced.

TABLE V

| Test No. | 14 | 15 | 16 | 17 |
|---|---|---|---|---|
| | UNTREATED MUD | | POROUS IRON OXIDE TREATED MUD | |
| | BEFORE AGING | AFTER 65 HRS. | BEFORE AGING | AFTER 65 HRS. |
| Weight (ppg) | 10.6 | 10.6 | 10.7 | 10.7 |
| $d_{600}$ | 44 | 103 | 30 | 70 |
| $d_{300}$ | 31 | 77 | 19 | 55 |
| PV | 13 | 26 | 11 | 15 |
| YP | 18 | 51 | 3 | 40 |
| Gels - immediately on stirring | 15 | 5 | 3 | 35 |
| - after ten minutes | 57 | 97 | 21 | 75 |
| Shear Strength (psi) | — | 600 | — | 250 |

EXAMPLE 5

One of the purposes of this example was to investigate whether that the porous iron oxide has better lubricating qualities than barite. Two slurries were prepared, one was a 14.0 pound per gallon mixture of barite and bentonite and the other was a 14.0 pound per gallon mixture of porous iron oxide and bentonite. The friction coefficient for each slurry was determined with a Baroid tester and is reported in Table VI below.

TABLE VI

| Mud System | Friction Coefficient |
|---|---|
| Barite-bentonite | 0.32 |
| Porous Iron Oxide-bentonite | 0.28 |

EXAMPLE 6

This example demonstrates the effectiveness of the porous iron oxide of this invention in reacting hydrogen sulfide to form $FeS_2$. It is also demonstrated that hydrogen sulfide is not regenerated from the $FeS_2$ once it is formed.

In drilling an oil well, hydrogen sulfide gas was emitted at the well head from the circulating drilling mud. The drilling mud turned green and blackening of the drill pipe due to sulfide corrosion was observed. The porous $Fe_3O_4$ of this invention was then added into the circulating mud, in the proportion of approximately 10 pounds per barrel to slightly basic water-based mud weighing approximately 10 pounds per gallon.

On a single re-circulation of the mud containing the $Fe_3O_4$ additive, the emissions of hydrogen sulfide ceased; and even the odor of hydrogen sulfide was no longer noted at the well head. Within 2 days the drill pipe was observed to be cleaned of the sulfide effect.

A sample of cuttings from the mud, then taken, was examined and compared with cuttings taken immediately before treating with $Fe_3O_4$. The treated mud sample was found to contain $FeS_2$ whereas the untreated mud contained no substantial amount of $FeS_2$.

EXAMPLE 7

This example also demonstrates the reactivity of the porous iron oxide with hydrogen sulfide. A drill stem test was conducted in a zone known to contain hydrogen sulfide. 300 feet of open hole had been tested; and 600 parts per million $H_2S$ was measured to surface. Subsequently after the drill stem test, mud circulated from the bottom of the hole and containing the present $Fe_3O_4$ was observed to be severely gas cut for 35 minutes. This fluid showed no evidence of hydrogen sulfide, proving that all had been reacted by the $Fe_3O_4$.

A sample of this mud was observed to contain $FeS_2$ as the result of the reaction with $H_2S$. This mud was acidified to a pH of 3 without release of hydrogen sulfide, as proved by lack of hydrogen sulfide odor. This test confirmed the stability of $FeS_2$, once formed, in acid; that is, that the removal of hydrogen sulfide reacted by the present additive was permanent and the gas would not be subsequently released.

EXAMPLE 8

This example demonstrates that the porous iron oxide of the present invention, when reacted by hydrogen sulfide, forms a coarser agglomerated pyrite which substantially removes itself by being screened out with drill cuttings.

In an oil field where great quantities of gas had been encountered, concentrations of hydrogen sulfide were so great that, in a previous well, hydrogen embrittlement of the drill pipe was experienced, with subsequent failure and loss of the hole.

An offset well was then drilled, with the mud treated with 13 pounds per barrel of the present porous $Fe_3O_4$. Gas flow was encountered in which the drilling mud weight was reduced from 12.4 pounds per gallon to 10.3 pounds per gallon. Over a period of approximately 48 hours the mud density was increased to approximately 13.3 pounds per gallon while continuously flaring gas and holding 100 psi back pressure on the well annulus. Nevertheless $H_2S$ could not be detected at the surface and no evidence of pipe embrittlement or corrosion was observed.

That large quantities of hydrogen sulfide had been reacted was evident from large amounts of agglomerated pyrite screened out with the drill cuttings, with measurable reduction in the concentration of $Fe_3O_4$ in the drilling mud.

The present invention thus contributes a substantial improvement to the drilling mud art. It will be readily apparent to those skilled in the art that various changes and modifications may be made without departing from the scope of the invention as it is more precisely defined in the subjoined claims. In them the phrase "substantially $Fe_3O_4$" is to be taken to include $FeO.Fe_2O_3$.

I claim:

1. A method of scavenging hydrogen sulfide from drilling mud, which comprises the following steps:
    a. adding to drilling mud porous iron oxide particles having an ideal composition of substantially $Fe_3O_4$ and having a surface area at least 10 times as great as magnetite particles of equal size, the greater part of which particles are no longer than 60 microns, in a quantity sufficient to react such hydrogen sulfide as may be encountered,
    b. circulating the drilling mud down the interior of the drill pipe, through the drill bit and up the annular space between the drill pipe and the formation wall to the surface,
    c. entraining in the circulating drilling mud such hydrogen sulfide as may be encountered, and
    d. reacting the entrained hydrogen sulfide with the said porous iron oxide particles under the pressure there present to form a stable pyrite $FeS_2$.

2. The method of claim 1 wherein at least 95% of said particles are no larger than 60 microns.

3. The method of claim 1, together with the additional steps of
    screening the circulated mud containing the $FeS_2$ so formed and thereby removing agglomerated particles thereof,
    re-circulating the mud, and
    adding to the mud so re-circulated additional said iron oxide to replace the amount so reacted.

* * * * *